United States Patent [19]

Weber et al.

[11] Patent Number: 4,570,813
[45] Date of Patent: Feb. 18, 1986

[54] CONNECTION ANCHOR FOR LINER OF CAST IRON PRESSURE TANK

[75] Inventors: Rolf Weber; Gerd Pollak; Arno Chlechowitz, all of Gummersbach, Fed. Rep. of Germany

[73] Assignee: L. & C. Steinmüller GmbH, Gummersbach, Fed. Rep. of Germany

[21] Appl. No.: 731,057

[22] Filed: May 6, 1985

Related U.S. Application Data

[63] Continuation of Ser. No. 526,351, Aug. 25, 1983.

[30] Foreign Application Priority Data

Dec. 16, 1982 [DE] Fed. Rep. of Germany ....... 3246560

[51] Int. Cl.$^4$ ............................................. B65D 45/02
[52] U.S. Cl. ...................................... 220/3; 220/4 C; 220/5 A; 220/71
[58] Field of Search ................... 220/3, 4 C, 5 A, 461, 220/462, 463, 464, 71

[56] References Cited

U.S. PATENT DOCUMENTS

| | | | |
|---|---|---|---|
| 3,066,822 | 12/1962 | Watter | 220/3 |
| 3,166,212 | 1/1965 | Resos | 220/5 A X |
| 3,176,204 | 1/1965 | Rouse, Jr. | 220/5 A |
| 3,338,238 | 8/1967 | Warncke | 220/3 X |
| 3,920,518 | 11/1975 | Brissaud et al. | 220/3 X |
| 4,057,162 | 11/1977 | Gross | 220/71 X |
| 4,111,327 | 9/1978 | Janakiev | 220/3 |
| 4,125,202 | 11/1978 | Schilling | 220/5 A X |
| 4,322,880 | 4/1982 | Lampe | 220/3 X |
| 4,457,449 | 7/1984 | Bohlander et al. | 220/3 X |
| 4,463,872 | 8/1984 | Yellowlees | 220/3 X |

OTHER PUBLICATIONS

Nuclear Engineering and Design, vol. 28, No. 3, 9/74, Beine, Gross and Schilling.

Primary Examiner—Steven M. Pollard
Attorney, Agent, or Firm—Becker & Becker, Inc.

[57] ABSTRACT

A pressure vessel including a cylindrical vessel shell body, a bottom, and a cover, which are composed of cast elements and are clamped together or restrained by axial prestressing tendons located in channels which are distributed over the periphery of the cylindrical shell body, have axes which are parallel to the axis of the vessel, and by tangential prestressing cables located in annular channels on the outer surface of the vessel. The pressure tank also includes a steel liner which is anchored by means of a special gun welded or bolt connection directly to the inner side of the tank shell body. This tank shell body includes at least two cylindrical shells which are formed of cast elements and are successively arranged when viewed in the radial direction.

8 Claims, 2 Drawing Figures

CONNECTION ANCHOR FOR LINER OF CAST IRON PRESSURE TANK

CROSS-REFERENCE TO RELATED APPLICATION

This is a continuation of co-pending parent U.S. patent application Ser. No. 526,351-Weber et al filed Aug. 25, 1983.

BACKGROUND OF THE INVENTION

1. Field of the Invention

The present invention relates to a pressure tank or prestressed cast iron pressure vessel which comprises a cylindrical tank shell body, a bottom, and a cover, which are composed of cast elements and are clamped together by means of axially extending prestressing cast steel elements, girders or braces arranged as tendons which are distributed over the circumference of the vessel body, have axes which are parallel to the axis of the vessel, and by means of tangentially prestressing steel elements located in channels on the outer surface of the vessel body; a pressure tank also comprises a steel liner which is anchored directly on the inner shell of the vessel body by means of a connection made of bolts with external threads and welded to the liner.

Within the framework of the present invention, the expression "cast element" refers to a structural element of cast metal, especially of cast iron or cast steel. With the heretofore known pressure tanks which are made into a cylindrical shell of cast elements, the structural differences are concentrated in the unsatisfactorily resolved problem of being able to fix or anchor a liner, which for sealing purposes or leak tightness is made of thin sheet steel and is not inherently stable as an independent structural part, directly on the cast elements of the tank shell body, i.e. without having to use a backfill between the liner and the cast shell. The difficulty of the liner anchoring is based on the one hand on criteria inherent to manufacture and assembly, and on the other hand on considerations regarding specific and definite boundary conditions of structural mechanics, especially for the analysis of strains due to the unbalanced forces in the liner plate, involved with a strength and quality insurance of the individual structual parts.

2. Description of the Prior Art

Among the heretofore known anchorings, elements having a variety of shapes are used, for example members having a T-profile, ribbed members which are provided with a compensating shaft, fishplate members, anchor plates provided with bolts, etc. Various stud bolts or bolt connections for anchoring the steel liner to the cast elements have also been proposed. In addition to welding onto the steel liner nuts, threaded bushes or screws, or screw bolts of conventional type in a more or less complicated configuration, it is also known to fasten by screw connection the steel liner to the cast elements using welded-on finned members or similarly profiled elements.

German Auslegeschrift No. 26 36 743 discloses a bolt connection according to which the steel liner is connected with the cast elements by means of so-called welding equipment and bolts which are welded onto intermediate liner sections.

The characteristic of all of these structural solutions is that, for reasons of manufacture and assembly, the liner anchoring is preferably disposed in the abutting areas of the cast elements. The drawback to this is that the liner, due to the number of anchorings, which is limited as a result of the localized distribution, unduly buckles during evacuation or cooling-off, as a result of which radially undefined force conditions in the wall of the cast elements are generated. Further drawbacks result from the shape of the predominantly one-sided sealing or tight welds and anchoring weldments or weld seams on the steel liner, whereupon difficulties arise during the welding-through and during the inspection of the weld seam connections. A further drawback is that the number of possible structural solutions for the anchoring of the liner to the cast elements is limited, since, due to the strength of the material and the reliability, only certain weld connections are allowed by the authorities as acceptable for pressure vessels.

It is an object of the present invention, while taking into consideration aspects of design, structure, production efficiency, assembly requirements, and economy, as well as permissible restrictions as allowed by the authorities, to optimally provide a cast-joint connection ahchor for a presuure tank of the aforementioned general type such that a steel liner thereof, which is disposed directly by means of a screw anchoring on the inner side of the tank shell body, which is built up of cast elements, at no position lifts-off from the cast elements as a result of varying pressure and heat conditions which occur during operation; furthermore, additional stressing of the screw anchoring is to be extensively avoided.

Several advantages are achieved with the pressure vessel of the present invention. The stepwise prefabrication of the cylindrical steel liner assures satisfactory connections, which are gas welded on both sides, to the sealing seams or tight welds of the sheet metal plates, and makes possible an all-around inspection of the structural members.

The steel liner is anchored on the innermost cylindrical shell, which is formed from the cast elements, at as many spots as desired without disturbance due to the axial and tangential prestressing tendons representing an important obJect of the invention. As a result of this anchoring, during cooling-off and evacuation operations, the stress is optimally taken over not only by the liner but also by the innermost cast element shell in their function as supporting stays. As a result, an undue lifting-off or buckling of the liner is avoided, and an additional stressing of the anchoring is extensively eliminated. The bracing or prestressing of the pressure tank shell body, which inventively is undertaken on the outer cylindrical shell, is in this way unaffected by these aforementioned stresses.

BRIEF DESCRIPTION OF THE DRAWINGS

These objects and other objects and advantages of the present invention, will appear more clearly from the following specification in conjunction with the accompanying drawings, in which.

SUMMARY OF THE INVENTION

Figure 1:
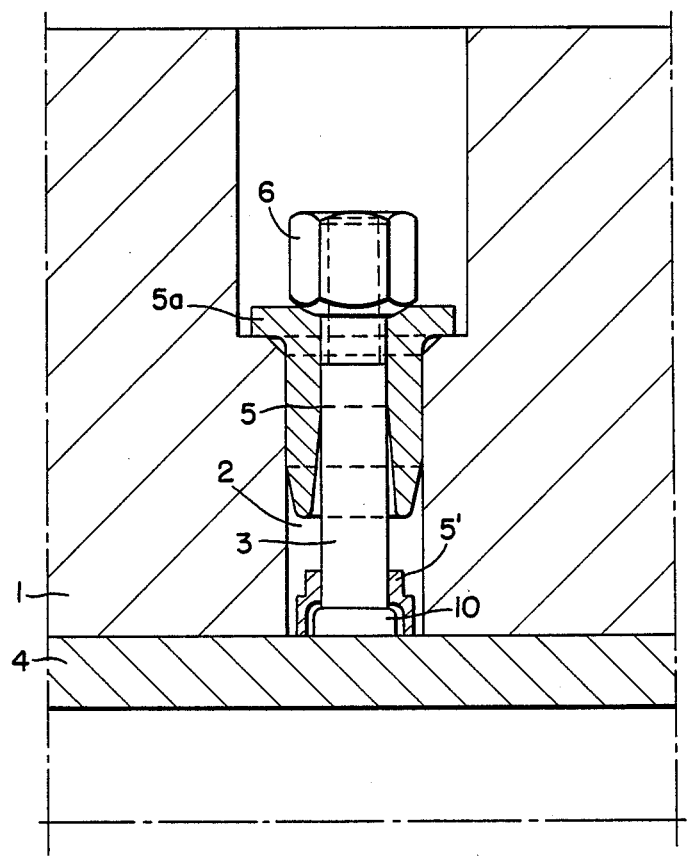
FIG. 1 shows a connection anchor for a liner in an enlarged section of a portion of a cross section through the shell body region of one preferred embodiment of the inventive pressure tank.
Figure 2:
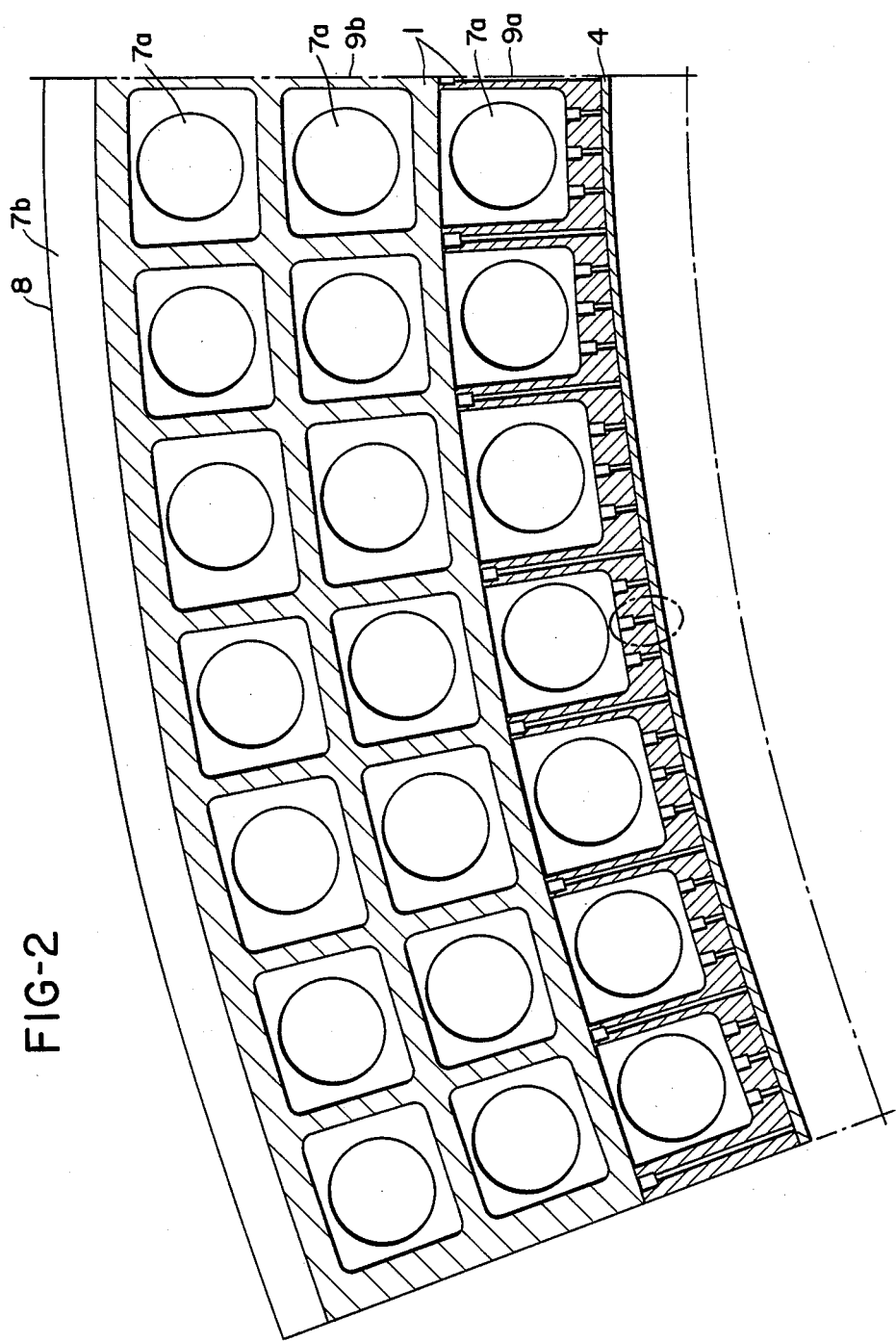
FIG. 2 shows the connection between the liner and cast elements with multi-shell pressure tanks as a portion of the pressure tank shell body.

The connection anchor for a liner of a pressure tank of the present invention is characterized primarily in that the tank shell body comprises at least two cylindrical shells which are formed of cast elements and are successively arranged when viewed in the radial direction.

Pursuant to a specific embodiment of the present invention, the steel liner must be prefabricated and may, by means of a bolt connection, be anchored, on the inner side of the innermost cylindrical shell of the tank shell body, with the cast elements, which are provided with tangential prestressing channels on the outer surface and prestressing ducts for the axial prestressing tendons. Preferably, the bolt connection is embodied as screw bolts which are welded onto the steel liner and have respectively associated therewith spacers or bushes (very important for adjusting the shear modules of the bolt connection as an object of the invention), and nuts. The cast elements which form the outer cylindrical shell, and which rest against the innermost cylindrical shell, may be held exclusively by tangential and axially prestressing elements that have parallel axes (cable under tension made of steel of high strength whereas hollow steel bodies mean cast elements

DESCRIPTION OF A PREFERRED EMBODIMENT

Referring now to the drawings in detail, screw bolts 3 are welded in a precise, localized distribution (resulting from strain analysis) onto the outer cylindrical side of the cylindrical liner 4 of the pressure vessel shell body 1; the liner 4 is prefabricated from thin sheet steel. Cast elements 9a placed upon the outer cylindrical side of the liner 4 are fastened thereto with the aid of spacers or flanged spacer sleeves 5, 5a and nuts 6 (a ceramic ring 6 is for welding purposes only). These cast elements 9a form the innermost cylindrical shell of the vessel shell body 1, and are clamped with the bottom and cover of the tank by means of axial prestressing tendons which are distributed on a circle line over the periphery of the cylinder, have parallel axes, and are located in channels or ducts 7a of the cast elements 9a. On the innermost cylindrical shell 9a is disposed the outer cylindrical shell 9b, which is also formed of cast elements 1. The outer cylindrical shell 9b is exclusively held by tangential prestressing steel wire windings which are distributed on the outer surface 8 of the vessel shell body, have parallel axes which are orthogonal to the axis of the vessel, and are disposed in appropriate prestressing channels 7b. As is the case with the inner cylindrical shell 9a, the outer cylindrical shell 9b is also clamped with the bottom and cover of the tank or vessel. The thickness of the cast elements 1 of the innermost cylindrical shell 9a is less than the thickness of the outer cylindrical she11, 9b, since the cast elements have different load tasks to fulfill. The connection bolts 3 are connected directly to the liner 4 by an anchor weld 10 in a location surrounded by bushing 5'.

The present invention is, of course, in no way restricted to the specific disclosure of the specification and drawings, but also encompasses any modifications within the scope of the appended claims.

What we claim is:

1. A linner connection anchor for a pressure vessel which includes an axis, a bottom, a cover, a vessel multiple shell body, and a steel liner which is anchored directly to the inside of said vessel multiple shell body by means of a bolt connection in combination therewith comprising at least two cylindrical shells, which are formed of cast elements and which are successively arranged in radial and tangential direction; said cast elements being provided with axially extending prestressing channels therein which are distributed over the periphery of said cylindrical vessel body, and also being provided with said tangential prestressing channels to received therein means for restraining together said bottom, said cover, and said vessel multiple shell body to compensate for dimensional length variations caused by temperature influence thereon and also to compensate for pressure loading of the pressure vessel in order to guarantee necessary stability of the pressure vessel including particularly said multiple shell body thereof.

2. A liner connection anchor.for a pressure vessel in combination according to claim 1, in which said steel liner is a prefabricated part, and is anchored by means of said bolt connection to the radially inner side of said cast elements of the radially innermost of said cylindrical shells of said vessel shell body.

3. A liner connection anchor for a pressure vessel in combination according to claim 2, in which said bolt connection includes screw bolts welded directly onto said steel liner by an anchor weld surrounded by a bushing as well as including therewith axially spaced flanged spacer screws and nuts for each of said screw bolts.

4. A liner connection anchor for a pressure vessel in combination according to claim 1, in which said vessel shell body comprises two cylindrical shells, with the cast elements of the radial outer shell resting on the radially innermost shell, and being held exclusively by said restraining means including tangential prestressing elements.

5. A steel liner, which is anchored directly to the inside of a prestressed cast iron pressure vessel by means of a bolt connection; said vessel includes a cylindrical vessel body, a bottom and a cover and comprises at least two layers, which are formed of cast elements and are successively arranged in the radial and tangential direction, said cast elements are provided with axial prestressing ducts which are distributed over the periphery of said cylindrical vessel body and, in the case of outer layer elements, provided with tangential prestressing channels on the outer vessel surface, to take in tangential wire winding and axial tendons for clamping together said bottom, said cover and said vessel cylindrical shell body.

6. A steel liner as a prefabricated part of said pressure vessel according to claim 5, which is anchored by means of said bolt connections to the inner side of the innermost layer of said cast elements.

7. A steel liner of a pressure vessel according to claim 6, onto which bolt connections are welded including screw bolts, bushes and nuts.

8. A pressure vessel according to claim 5, in which said vessel shell body, bottom and cover comprise two layers, with the cast elements of the outer layer resting on the innermost layer, and being clamped together by means of tangential prestressing elements on the outside surface of the outer layer and axial tendons running through each layer separately.

* * * * *